United States Patent
Dai et al.

(10) Patent No.: US 7,757,190 B2
(45) Date of Patent: Jul. 13, 2010

(54) DESIGN RULES CHECKING AUGMENTED WITH PATTERN MATCHING

(75) Inventors: Vito Dai, Santa Clara, CA (US); Jie Yang, Sunnyvale, CA (US); Norma Rodriguez, San Jose, CA (US); Luigi Capodieci, San Cruz, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 361 days.

(21) Appl. No.: 11/613,006

(22) Filed: Dec. 19, 2006

(65) Prior Publication Data

US 2008/0148211 A1 Jun. 19, 2008

(51) Int. Cl.
*G06F 17/50* (2006.01)
(52) U.S. Cl. .............................. 716/5; 716/4
(58) Field of Classification Search ........... 716/4–6
See application file for complete search history.

(56) References Cited

U.S. PATENT DOCUMENTS

| | | | |
|---|---|---|---|
| 2003/0061583 A1* | 3/2003 | Malhotra | 716/5 |
| 2005/0268256 A1* | 12/2005 | Tsai et al. | 716/4 |
| 2006/0265679 A1* | 11/2006 | Scheffer et al. | 716/8 |

* cited by examiner

*Primary Examiner*—Vuthe Siek
(74) *Attorney, Agent, or Firm*—Meyertons, Hood, Kivlin, Kowert & Goetzel, P.C.

(57) ABSTRACT

Layout patterns are identified as problematic when they have particular parameters required to exceed standard limits. The problematic layout patterns are associated with preferred design rules in a DRC-Plus deck. Layout data is scanned to generate match locations of any problematic layout patterns. The match locations are forwarded to a DRC engine that compares layout parameters of the match locations to corresponding preferred layout rules in the DRC-Plus deck. The DRC-Plus check results are used to modify the layout to improve manufacturability of the layout.

12 Claims, 4 Drawing Sheets

| DRC Plus Rule ID | Pattern | Preferred Rule |
|---|---|---|
| amd.demo100 | | Line-end space≥ 120nm |

FIG. 2

DESIGN RULES CHECKING AUGMENTED WITH PATTERN MATCHING

TECHNICAL FIELD

The present invention relates to semiconductor processes and in particular to design rules checking (DRC) to ensure that DRC compliant designs are manufacturable.

BACKGROUND INFORMATION

In semiconductor device fabrication, the various processing steps fall into four general categories: deposition, removal, patterning, and modification of electrical properties. Deposition is any process that grows, coats, or otherwise transfers a material onto the wafer. Available technologies consist of physical vapor deposition (PVD), chemical vapor deposition (CVD), electrochemical deposition (ECD), molecular beam epitaxy (MBE) and more recently, atomic layer deposition (ALD) among others. Removal processes are any that remove material from the wafer either in bulk or selective form and consist primarily of etch processes, both wet etching and dry etching such as reactive ion etch (RIE). Chemical-mechanical planarization (CMP) is also a removal process used between levels. Patterning covers the series of processes that shape or alter the existing shape of the deposited materials and is generally referred to as lithography. For example, in conventional lithography, the wafer is coated with a chemical called a "photoresist." The photoresist is exposed by a "stepper," a machine that focuses, aligns, and moves the mask, exposing select portions of the wafer to short wavelength light. The unexposed regions are washed away by a developer solution. After etching or other processing, the remaining photoresist may be removed by plasma ashing.

Modification of electrical properties has historically consisted of doping transistor sources and drains, originally by diffusion furnaces and later by ion implantation. These doping processes are followed by furnace anneal, or in advanced devices, by rapid thermal anneal (RTA), which serve to activate the implanted dopants. Modification of electrical properties now also extends to reduction of dielectric constant in low-k insulating materials via exposure to ultraviolet light in UV processing (UVP).

Many modern chips have eight or more levels produced in over 300 sequenced processing steps. The raw wafer is engineered by at minimum, growth of an ultra-pure, defect-free silicon surface through epitaxy. In the most advanced logic devices, prior to silicon epitaxy, tricks are performed to improve the performance of the transistors to be built. One method involves introducing a "straining step" wherein a silicon variant such as "silicon-germanium" (SiGe) is deposited. Once the epitaxial silicon is deposited, the crystal lattice becomes stretched somewhat, resulting in improved electronic mobility. Another method, called "silicon on insulator" technology involves the insertion of an insulating layer between the raw silicon wafer and the thin layer of subsequent silicon epitaxy. This method results in the creation of more idealized transistors with minimized parasitic effects.

Front end surface engineering is followed by: growth of the gate dielectric, traditionally silicon dioxide ($SiO_2$), patterning of the gate, patterning of the source and drain regions, and subsequent implantation or diffusion of dopants to obtain the desired complimentary electrical properties. In memory devices, storage cells (conventionally capacitors) are also fabricated at this time, either into the silicon surface or stacked above the transistor.

Once the various semiconductor devices have been created, they must be interconnected to form the desired electrical circuits. This process involves creating metal interconnecting wires that are isolated by insulating materials often referred to in the industry as dielectrics. The insulating material was traditionally a form of $SiO_2$ or a silicate glass, but recently new low dielectric constant materials are being used. These dielectrics presently have dielectric constants around 2.7, although materials with constants as low as 2.2 are being offered to chipmakers.

Historically, the metal wires consisted of aluminum. In this approach to wiring often called "subtractive aluminum," blanket films of aluminum are deposited first, patterned, and then etched, leaving isolated wires. Dielectric material is then deposited over the exposed wires. The various metal layers are interconnected by etching holes, called "vias," in the insulating material and depositing tungsten in them with a chemical vapor deposition (CVD) technique. This approach is still used in the fabrication of many memory chips such as dynamic random access memory (DRAM) as the number of interconnect levels is small, currently no more than four.

More recently, as the number of interconnect levels for logic has substantially increased due to the large number of transistors that are now interconnected in a modern microprocessor, the timing delay in the wiring has become significant prompting a change in wiring material from aluminum to copper and from the aforementioned silicon dioxides to newer low-K materials. This performance enhancement also comes at a reduced cost via "damascene" processing that eliminates processing steps. In damascene processing, in contrast to subtractive aluminum technology, the dielectric material is deposited first as a blanket film and is patterned and etched leaving holes or trenches. In "single damascene" processing, copper is then deposited in the holes or trenches surrounded by a thin barrier film resulting in filled vias or wire "lines" respectively. In "dual damascene" technology, both the trench and via are fabricated before the deposition of copper resulting in formation of both the via and line simultaneously, further reducing the number of processing steps. The thin barrier film, called Copper Barrier Seed (CBS), is a necessary evil to prevent copper diffusion into the dielectric. As the presence of excessive barrier film competes with the available copper wire cross section, formation of the thinnest yet continuous barrier represents one of the greatest ongoing challenges in copper processing.

Design Rule Checking or Check(s) (DRC) is the area of Electronic Design Automation that determines whether a particular chip design satisfies a series of recommended parameters called Design Rules. Design rule checking is a major step during Physical verification of the design, which may also involve LVS (Layout versus schematic) Checks, XOR Checks, ERC (Electrical Rule Check) and Antenna Checks.

Design Rules are a series of parameters provided by semiconductor manufacturers that enable the designer to verify the correctness of his or her schematic and/or mask set. Design rules are specific to a particular semiconductor manufacturing process. A design rule set specifies certain geometric and connectivity restrictions to ensure sufficient margins to account for variability in semiconductor manufacturing processes, so as to ensure that most of the parts work correctly. Design rule sets have become increasingly more complex with each subsequent generation of semiconductor process.

The main objective of DRC is to achieve a high overall yield and reliability for the design. If design rules are violated the design may not be functional. To meet this goal of improving die yields, DRC has evolved from simple measurement and Boolean checks, to more involved rules that modify existing features, insert new features, and check the entire design for process limitations such as layer density. A completed layout consists not only of the geometric representation of the design, but also data that provide support for manufacture of the design. While design rule checks do not validate that the design will operate correctly, they are constructed to verify that the structure meets the process constraints for a given design type and process technology.

DRC software usually takes as input a layout in a standard format, and produces a report of design rule violations that the designer may or may not choose to correct. Carefully "stretching" or waiving certain design rules is often used to increase performance and component density at the expense of yield.

DRC is a very computationally intense task. If run on a single CPU, customers may have to wait up to a week to get the result of a Design Rule check for modern designs. Most design companies require DRC to run in less than a day to achieve reasonable cycle times since the DRC will likely be run several times prior to design completion. Some examples of DRC's in IC design include but are not limited to the following:

a) active to active spacing
b) well to well spacing
c) minimum channel length of the transistor
d) minimum metal width
e) metal to metal spacing metal fill density (for processes using CMP)
f) ESD and I/O rules Meeting a set of design rules may not be adequate wherein the rules may be affected by the complexity of the layout pattern containing a particular feature or rule. A particular rule may be adequate in one pattern but require modification in another pattern to insure that a particular IC layout has the best manufacturability.

Therefore, there is a need for a method to augment standard DRC specifically targeting problematic layouts using 2D pattern matching and enforcing different design rules. This will ensure that designs that pass checking will indeed be manufacturable.

SUMMARY

Layout geometries that present problematic manufacturability are identified and special design rules are constructed to apply to these problem geometries. These special rules are coded and linked to problem geometry identifiers. The data base of geometries are dynamic and are added to as new problem geometries are identified. The design rules checking (DRC)-Plus software of the present invention is built to run on top of existing software tools. For each DRC-Plus rule (e.g., line to line spacing), problematic patterns are matched against patterns in the layout containing features these features (spaced lines) to which special rules may apply. This produces a set of match locations for the DRC engine to target application of preferred rules. The DRC-Plus results are in the same format as standard DRC so the overhead in integrating into standard DRC flow is minimal.

The foregoing has outlined rather broadly the features and technical advantages of the present invention in order that the detailed description of the invention that follows may be better understood. Additional features and advantages of the invention will be described hereinafter which form the subject of the claims of the invention

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is a table illustrating DRC-Plus Rule ID, a corresponding problematic pattern, and a preferred rule that applies to the problematic pattern;

DETAILED DESCRIPTION OF THE INVENTION

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, data formats within communication protocols, and the like have been omitted in as much as such details are not necessary to obtain a complete understanding of the present invention and are within the skills of persons of ordinary skill in the relevant art.

Figure 1:
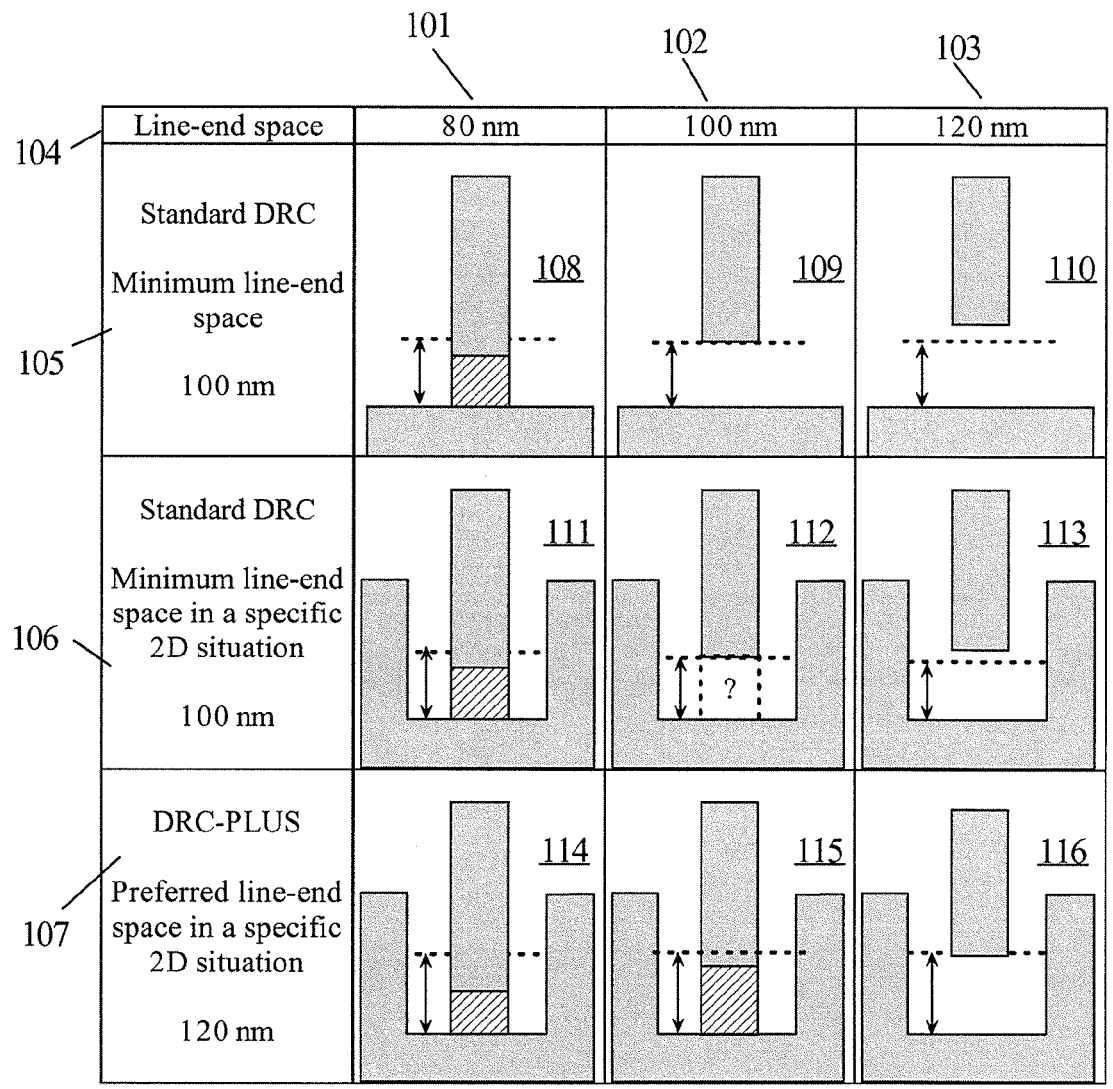
FIG. 1 is a table comparing DRC-Plus according to embodiments of the present invention to standard DRC.

FIG. 1 illustrates in table form exemplary rules checking comparison between standard DRC and DRC-Plus according to embodiments of the present invention. Row 104 lists line-end spacing to another line cases of 80-120-nm. Row 104 illustrates the standard DRC rule that requires a minimum of 100 nm for this orthogonal line-end to line spacing. Pane 108 shows the 80 nm case which clearly violates the rule and would be flagged as an error. Panes 109 and 110 respectively show the 100 and 120 nm cases which would pass the standard DRC.

Row 105 illustrates the case where the line-end is surrounded with parallel line segments forming a 2-D configuration. Pane 111 shows an 80 nm line-end spacing which again would flag an error with standard DRC. Pane 112 shows the 100 nm case which would also pass standard DRC. However, because of the density of polygons surrounding the line-end that are necessary to form the 2D configuration, the line-end case which 100 nm spacing may be difficult to manufacture and may affect IC chip yields. Pane 113 illustrates a more appropriate 120 nm line-end spacing when surrounded by the 2-D structure. In this case, the marginal situation (e.g., 100 nm line-end spacing+2-D structure) would pass but may result in reduce yields.

Row 106 illustrates DRC-Plus where a preferred line-end space rule is enforced when 2D pattern recognition software determines that previously identified 2-D patterns. A preferred line-end rule is then applied whenever a line-end situation is determined to be within a previously identified 2D pattern. In this case both the 80 nm case illustrated in Pane 114 and the 100 nm case in Pane 115 would be identified as cases where the preferred rule would be applied.

Figure 2:
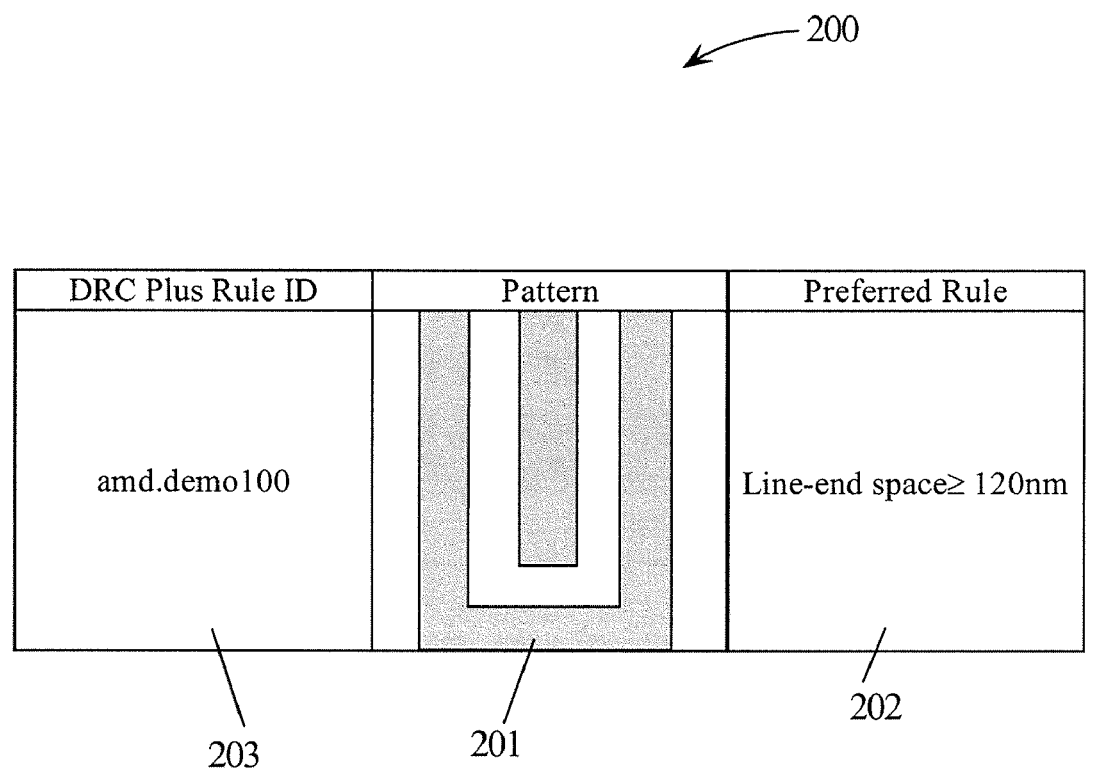

FIG. 2 illustrates an exemplary DRC-Plus rule 200 according to embodiments of the present invention. The combination of pattern 201 followed with a preferred DRC rule 202 to apply to patterns matching the pattern 201 constitutes a DRC-Plus rule which in this case is identified with an exemplary DRC-Plus rule ID 203. A collection of DRC-Plus rules may be gathered together as a DRC-Plus technology rule deck and design manual similar to DRC. The only difference is that each rule is annotated with a specific pattern (e.g., pattern 201) to describe the specific 2-D situation where the preferred rule is applied.

Figure 3:
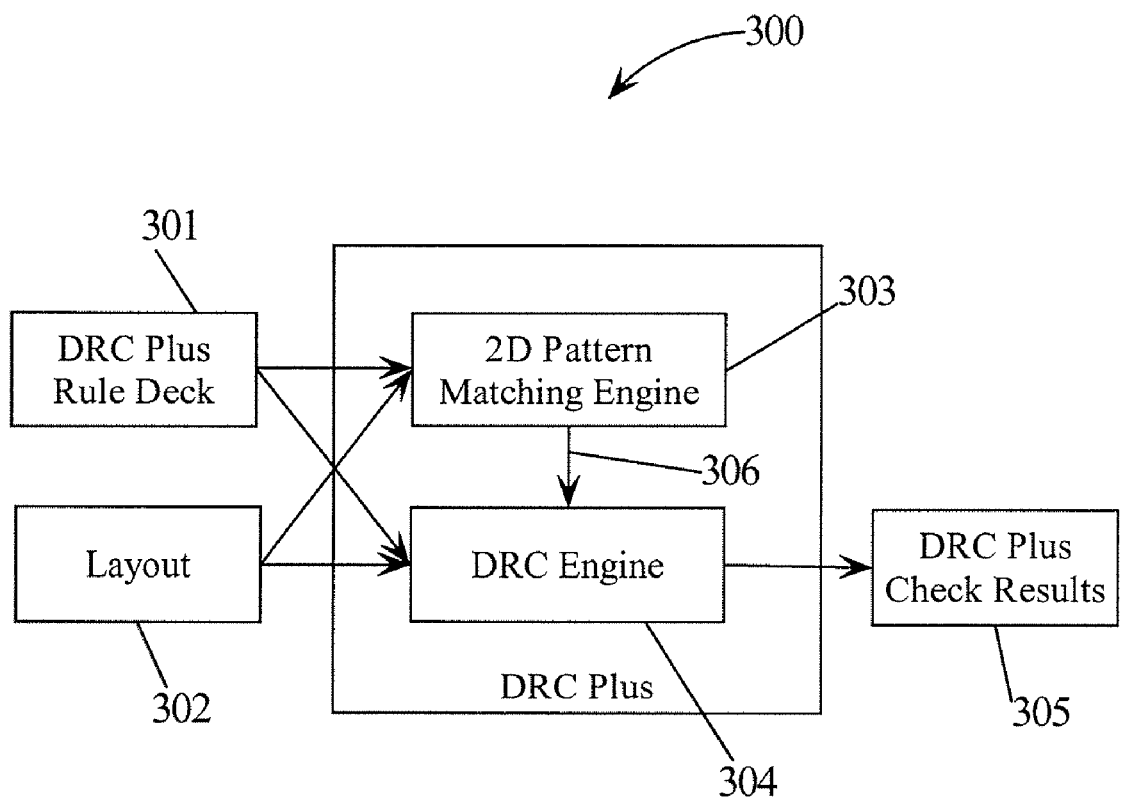
FIG. 3 is a block diagram illustrating how the DRC-Plus software according to embodiments of the present invention integrates with existing software to produce DRC Plus check results.

FIG. 3 illustrates that DRC-Plus software 300 developed according to embodiments of the present invention is built to run on top of existing software tools. The 2-D Pattern Match Engine 303 and the DRC Engine 304 are software provided by vendors. The DRC-Plus rule deck 301 is constructed to provide preferred rules for previously identified 2-D patterns that have been determined to be problematic. The layout data 302 is scanned by the 2-D Pattern Match Engine 303 to find patterns that match those in the DRC-Plus rule deck 301. The matching locations 306 are forwarded to the DRC engine 304 which applies the preferred rules from the DRC-Plus rule deck 301. The DRC-Plus Check Results 305 are then provided for the layout 302.

Figure 4:
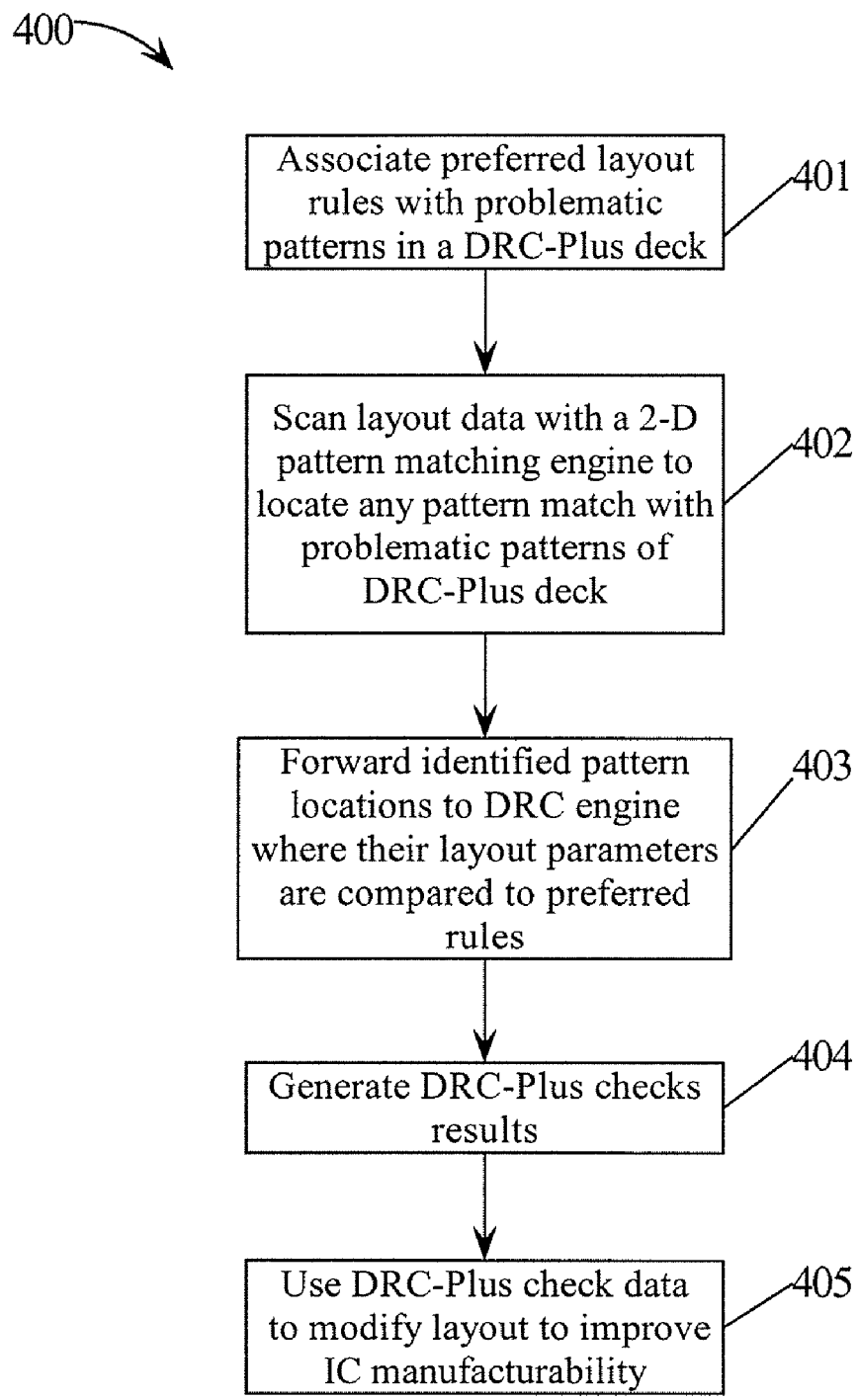
FIG. 4 is a flow diagram of method steps according to embodiments of the present invention.

FIG. 4 is a flow diagram of method steps 400 according to embodiments of the present invention. In step 401, problematic 2-D layout patterns are identified and associated with preferred layout rules. In step 402, data defining a layout is scanned to identify particular pattern locations that fall within the scope of the problematic 2-D layout patterns. In step 403, the pattern locations are forwarded to a DRC Engine where their layout parameters are compared to the preferred rules from the DRC-Plus deck. In step 404, the DRC-Plus Check results are generated for the layout. In step 405, the DRC-Plus Check results are used to modify the layout data 302 to produce a layout design that has improved manufacturability.

Although the present invention and its advantages have been described in detail, it should be understood that various changes, substitutions and alterations can be made herein without departing from the spirit and scope of the invention as defined by the appended claims.

What is claimed is:

1. A method for improving the layout design of an integrated circuit (IC) fabricated in a particular manufacturing process comprising the steps of:
   associating data defining problematic layout patterns for the manufacturing process with preferred layout design rules creating a DRC-Plus deck;
   scanning data defining a layout with a 2-D Pattern Match Engine thereby generating match locations corresponding to any of the problematic layout patterns;
   forwarding the match locations to a DRC Engine that compares layout parameters of the match locations to the corresponding preferred rules in the DRC-Plus deck; and
   generating DRC-Plus check results indicating layout problem areas.

2. The method of claim 1 further comprising the step of modifying the layout design where appropriate using the DRC-Plus check results to comply with the preferred rules.

3. The method of claim 1, wherein the problematic layout patterns are determined using test data correlating failures with corresponding layout parameters.

4. The method of claim 1, wherein the 2-D Pattern Match Engine is Éclair by CommandCAD configurable to identify predetermined layout patterns.

5. The method of claim 1, wherein the layout parameters comprise:
   active area to active area spacing;
   well to well spacing;
   minimum channel length of a transistor in the layout;
   minimum metal width;
   metal to metal spacing metal fill density; and
   electro-static discharge (ESD) and input/output (I/O) parameters.

6. The method of claim 2 further comprising the step of using the layout design after the modifying step to fabricate a photomask for fabricating the IC in the manufacturing process.

7. A computer program product for improving a layout design of an Integrated Circuit (IC) fabricated in a particular manufacturing process and embodied in a computer storage device, including programming for a processor, the computer program comprising a program of instructions for performing the program steps of:
   receiving data defining problematic layout patterns for the manufacturing process;
   associating preferred design rules with the problematic layout patterns thereby generating a DRC-Plus deck;
   inputting layout data to a 2-D Pattern Match Engine that scans the layout data to generate match locations corresponding to any of the problematic layout patterns;
   forwarding the match locations to a DRC Engine that compares layout parameters of the match locations to the corresponding preferred rules in the DRC-Plus deck; and
   generating DRC-Plus check results indicating layout problem areas.

8. The computer program product of claim 7 further comprising the step of outputting data for modifying the layout design in response to the DRC-Plus check results.

9. The computer program product of claim 7, wherein the problematic layout patterns are determined using test data correlating failures with corresponding layout parameters.

10. The computer program product of claim 7, wherein the 2-D Pattern Match Engine is Éclair by CommandCAD configurable to identify predetermined layout patterns.

11. The computer program product of claim 7, wherein the layout parameters comprise:
   active area to active area spacing;
   well to well spacing;
   minimum channel length of a transistor in the layout;
   minimum metal width;
   metal to metal spacing metal fill density; and
   electro-static discharge (ESD) and input/output (I/O) parameters.

12. The computer program product of claim 8, wherein the layout design after the modifying step is used to fabricate a photomask for manufacturing the IC.

* * * * *